United States Patent Office 3,087,819
Patented Apr. 30, 1963

3,087,819
ANIMAL FEEDING BLOCK AND PROCESS FOR PREPARING THE SAME
Richard C. Harris, Wellington, Somerset, England, assignor to Corn Products Company, New York, N.Y., a corporation of Delaware
No Drawing. Filed Aug. 3, 1960, Ser. No. 47,131
Claims priority, application Great Britain Aug. 6, 1959
2 Claims. (Cl. 99—2)

This invention relates to animal feeding stuffs and particularly to so-called "licks." In this specification the term "lick" means a solid mass of edible substance which can be placed on the ground for animals to lick and thereby consume slowly.

The "licks" are normally placed at various points in fields where they are readily accessible to the animals. They are provided to enable animals to make up deficiencies of diet in natural grazing or to obtain nutrient, prophylactic, or therapeutic substances.

These "licks" are of necessity exposed to some extent to the weather and since they contain water soluble substances, they are normally particularly vulnerable to the action of rain and dew, consequently there has hitherto been considerable risk of loss by dissolution.

It is an object of this invention to reduce this risk of loss without at the same time either impairing the nutritive value or reducing the availability of the "lick" to an animal. With this object in view a "lick" according to the present invention is made of glucose (dextrose) with or without the addition of specific nutrient, prophylactic or therapeutic substances, and including a solution inhibitor for resisting rapid dissolution of the "lick," such as chalk or its equivalents, and a non-toxic water-soluble gum or other substance capable of forming a highly viscous solution in water, such as gum acacia, methyl cellulose, methyl ethyl cellulose, sodium carboxy methyl cellulose, sodium alginate, gelatine, sodium pectate and specially treated starches.

The chalk additive is preferably calcium carbonate having a particle size between 1 and 25 microns, and preferably also composed of the calcareous shells of Foraminifera subjected to a method of size reduction to bring the particles down to the size range given without undue destruction of the hollow characteristic of the particles. Such a chalk substance is advantageously incorporated in the block in the proportions of between 2½% and 10% of the total weight of the block.

The procedure employed for forming the solid composition of this invention comprises admixing the additive or additives with a hot glucose liquor, having a high dextrose equivalent and capable of crystallizing on cooling, by agitation in a mixing vessel and, when homogeneity has been attained, discharging the hot liquid into a mold in which it is allowed to crystallize and set to a solid mass.

The water soluble gums are to be added at the rate of ½% to 5%.

The effect of the incorporation of chalk in conjunction with a water soluble gum or substance giving a highly viscous solution in water is that water falling or condensing on the surface of the inhibited block forms initially a thick syrupy solution of glucose, the viscosity of which is further increased by the presence of chalk and resists further dilution and subsequent run-off of the resulting solution. However, the formation of this viscous solution does not reduce the availability of the "lick" to the animal, as the process of licking involves mechanical abrasion apart from the solvent action of the saliva.

The use of sodium alginate or sodium pectate has a further advantage in that the highly viscous solution formed initially reacts with small quantities of calcium in the "lick" to form a water insoluble calcium alginate or pectate gel, which is relatively impervious to water. This soft gel structure is readily removed by an animal's tongue in the act of licking.

While I have named glucose in the description of my invention, it is to be understood that my invention is not limited to the use of glucose (dextrose) but includes all equivalents of glucose.

I claim:
1. A "lick" comprising a solid, homogeneous admixture of glucose with a minor amount of a solution inhibitor; said solution inhibitor comprising an admixture of chalk with at least one other non-toxic, water-soluble substance capable of forming a highly viscous solution in water.

2. A process for preparing a "lick" which comprises: admixing a crystallizable glucose liquor with chalk and at least one other non-toxic water soluble substance capable of forming a highly viscous solution in water; forming a homogeneous mixture; and allowing the mixture to crystallize and set to a solid mass.

References Cited in the file of this patent
UNITED STATES PATENTS

| | | |
|---|---|---|
| 1,960,548 | Pfeiffer | May 29, 1934 |
| 2,098,998 | Brinton | Nov. 16, 1937 |
| 2,638,433 | George | May 12, 1953 |
| 2,774,710 | Thompson et al. | Dec. 18, 1956 |

OTHER REFERENCES

"Structure and Composition of Foods," by Winton, vol. IV, John Wiley & Sons, Inc., New York, 1939, p. 15.